United States Patent [19]

Chesnutt et al.

[11] Patent Number: 5,123,723

[45] Date of Patent: Jun. 23, 1992

[54] ULTRA-HIGH VACUUM TELESCOPING FIBER OPTIC FEEDTHROUGH APPARATUS AND METHOD

[75] Inventors: Julian M. Chesnutt, Wichita Falls; Thomas E. McNeil, San Antonio, both of Tex.; James J. McNally, Albuquerque, N. Mex.; Duane K. Dunlap, Black Forest, Colo.

[73] Assignee: The United States of America as represented by the Secretary of the Air Force, Washington, D.C.

[21] Appl. No.: 510,647

[22] Filed: Apr. 18, 1990

[51] Int. Cl.⁵ ........................... G02B 7/10; G02B 6/32; G02B 7/22; G02B 27/62

[52] U.S. Cl. ..................................... 385/33; 359/503; 359/823

[58] Field of Search ............. 350/577, 574, 255, 96.20

[56] References Cited

U.S. PATENT DOCUMENTS

| | | | |
|---|---|---|---|
| 2,164,747 | 7/1939 | Landis | 350/574 |
| 2,196,583 | 4/1940 | Collins | 350/574 |
| 2,465,764 | 3/1949 | Underhill | 350/255 |
| 4,593,970 | 6/1986 | Rhodes | 350/96.20 |
| 4,818,067 | 4/1989 | Maisenbacher et al. | 350/255 |
| 4,822,130 | 4/1989 | Maranto et al. | 350/96.20 |
| 4,859,021 | 8/1989 | Wall | 350/96.20 |
| 4,865,410 | 9/1989 | Estrada et al. | 350/96.20 |

OTHER PUBLICATIONS

L. D. Dickson, "Laser Beam Expander ...", *IBM Tech. Dis. Bull.*, vol. 17, No. 11, Apr., 1975, p. 3414.

*Primary Examiner*—Jon W. Henry
*Attorney, Agent, or Firm*—Stanton E. Collier; Donald J. Singer

[57] ABSTRACT

The ultra-high vacuum telescoping fiber optic feedthrough apparatus comprises a first tubular section having thereon a mounting flange, a quartz window aperture, and a collimating lens means. The second tubular section being in sliding contact with the first tubular section has a focusing lens means mounted therein. A third tubular section being in sliding contact with the second tubular section has mounted therein a fiber optic cable holding means. In order to provide adjustability between the various sections a first adjusting means being a micrometer screw is mounted onto the first and second sections and a second adjusting means is mounted onto the second and third sections whereby fine adjustment in translational movement is achieved so that the signal-to-noise may be maximized when observing an optically luminescent source such as a plasma formed during laser deposition.

5 Claims, 2 Drawing Sheets

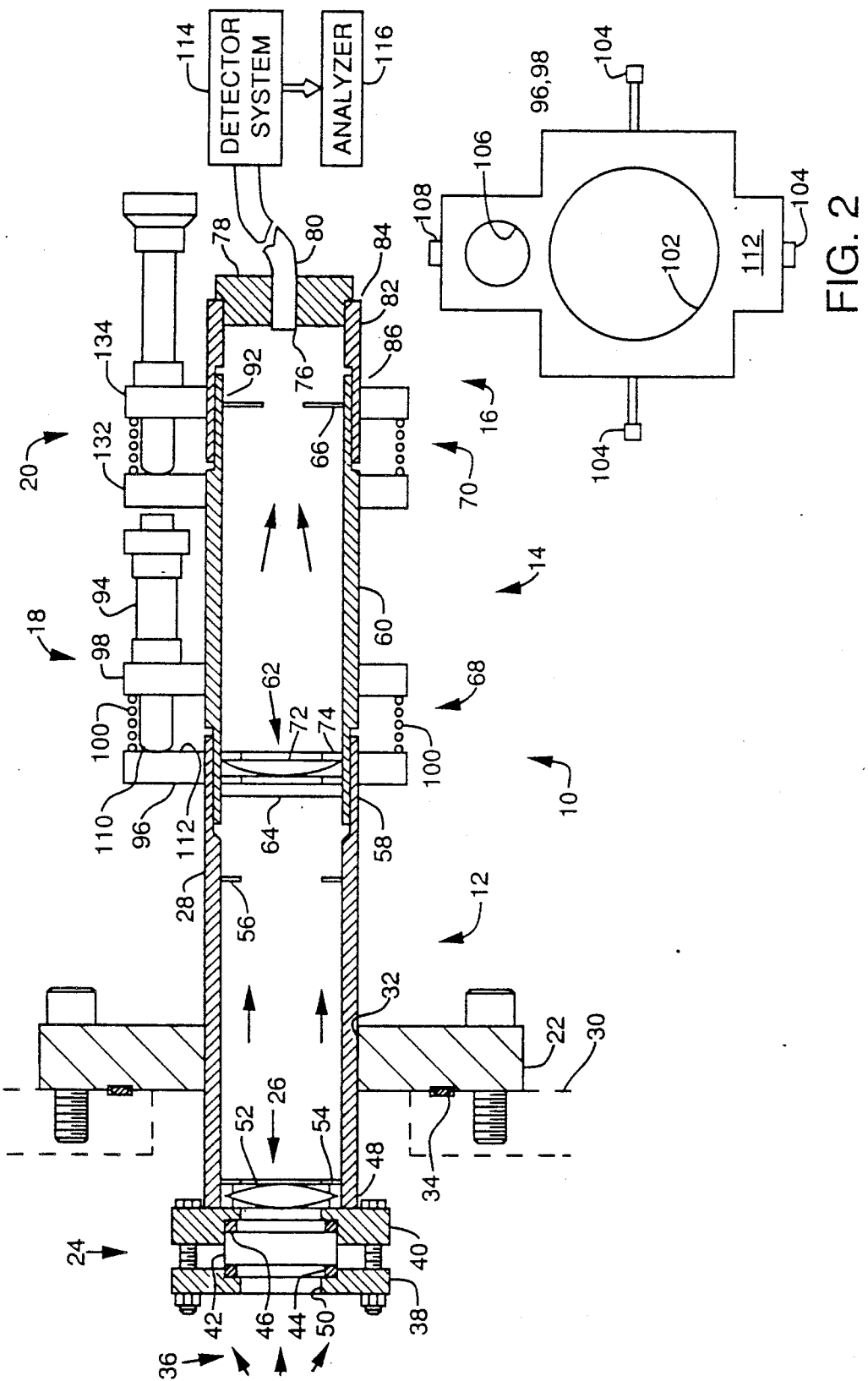

ULTRA-HIGH VACUUM TELESCOPING FIBER OPTIC FEEDTHROUGH APPARATUS AND METHOD

STATEMENT OF GOVERNMENT INTEREST

The invention described herein may be manufactured and used by or for the Government for governmental purposes without the payment of any royalty thereon.

BACKGROUND OF THE INVENTION

The present invention relates to an apparatus and method for spectrum analysis, and, in particular, relates to an apparatus for collecting plasma emissions from a chamber.

The analysis of plasma emissions from a laser deposition process, for example, is difficult for several reasons. For one, the vacuum chamber may not have a probe designed to observe both a broad source and a point source without extensive modifications. For another, the probe may not be able to observe different locations because it is fixed. For another, the probe may lack sufficient light gathering ability to observe the source of concern. For another, the probe may not be able to optimize the signal-to-noise because of a fixed geometry.

These and many other problems present a need for an apparatus to measure plasma emissions in a chamber.

SUMMARY OF THE INVENTION

The present invention is an apparatus and method for collecting light emissions to be analyzed. The present invention is connected into a vacuum chamber.

The ultra-high vacuum telescoping fiber optic feedthrough apparatus comprises a first tubular section having thereon a mounting flange, an aperture, and a collimating means. A second tubular section being in sliding contact with the first tubular section has a focusing means mounted therein. A third tubular section being in sliding contact with the second tubular section has mounted therein a fiber optic cable holding means.

In order to provide adjustability between the various sections, a first adjusting means is mounted onto the first and second sections and a second adjusting means is mounted onto the second and third sections whereby fine adjustment in translational movement is achieved.

Therefore, one object of the present invention is to provide an apparatus and method that will image an optically luminescent source under vacuum to a fiber optic cable.

Another object of the present invention is to provide an apparatus and method that is able to maximize the signal-to-noise ratio.

Another object of the present invention is to provide an apparatus that is easily manufactured, easily assembled, and easily operated.

Another object of the present invention is to provide an apparatus that is attachable to standard vacuum chamber ports.

Another object of the present invention is to provide an apparatus that may be mounted on a moveable platform for observing various areas within a vacuum chamber.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIG. 1 is a partial cross section providing a side view of the apparatus of the present invention.

FIG. 2 is a view of a micrometer support attached to the tubular sections of the present invention.

DESCRIPTION OF THE PREFERRED EMBODIMENT

Figure 3:
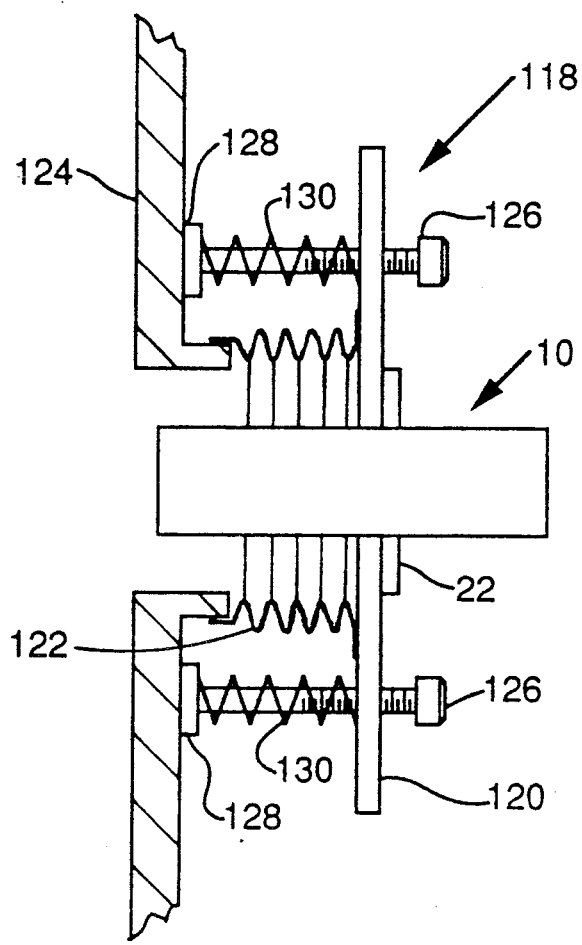
FIG. 3 is a partial cross section of a moveable platform holding the apparatus of the present invention.

Referring to FIG. 1, a ultra-high vacuum telescoping fiber optic feedthrough (UHVTFOF) apparatus 10 is shown therein.

The apparatus 10 has a first tubular section 12, a second tubular section 14, a third tubular section 16, a first adjusting means 18 and a second adjusting means 20.

The first tubular section 12 includes a tube body 28, a mounting flange 22, an aperture 24 and a collimating means 26.

The mounting flange 22, for example, has a standard flange size of 2.75 inches for bolting onto a vacuum chamber wall 30, shown in outline, having a 2.75 inch portal. A hole 32 is cut into the flange 22 and then the flange 22 is welded, being air tight, onto the tube body 28. A standard o-ring 34 is placed between the wall 30 and the mounting flange 22 for a vacuum seal.

The aperture 24, being inside the vacuum chamber, allows light emissions 36, represented by arrows, to enter into the apparatus 10, and further, seals the vacuum therein. The aperture 24 consists of a first collar 38 and a second collar 40, a window 42 made of, for example, fused quartz is held between two o-rings 44 and 46. The second collar 40 is welded to a first end 48 of the tube body 28. Each collar has a central hole 50 therethrough. Collars 38 and 40 are bolted together about the window 42 and o-rings 44 and 46 to produce a vacuum seal. The window material must obviously be selected to pass the particular emissions in question.

The collimating means 26 comprises a collimating lens 52 and a support 54 which, in combination, can slide into and out of the inside of the tube body 28.

Light baffles 56 may be placed inside of the tube body 28 to stop unwanted reflections and stray light.

The second end 58 of the tube body 28 is machined on the inside to a larger diameter to form an inside channel thereabout.

The second tubular section 14 comprises a tube body 60 and a focusing means 62. Additional features may include a filter means 64 and light baffles 66.

The tube body 60 is machined on both ends 68 and 70 on the outside to decrease the outside diameter so that the end 68 may closely slide within the second end 58 of the first tubular section 12.

The focusing means 62 includes a focusing lens 72 and a lens support 74 which can slide into the tube body 60. The focusing lens 72 images the collimated emissions directly on to a fiber end 76, to be described hereinafter; the second tubular section 14 is capable of "telescoping" to better focus the light and vary the focal ratio of the apparatus 10. This action is to be described hereinafter.

The third tubular section 16 includes a tube body 82, a fiber optic cable mount 78 and a fiber optic cable 80. The cable mount 78 is securely seated in a second end 84 of the tube body 82.

In order to insure that the exact area of interest is being observed by the apparatus 10, a low power visible light laser is inserted into the second end 84 of the third tubular section 16. The laser light is made to illuminate the intended target area. This procedure is carried out prior to vacuumization. After alignment, the cable mount 78 is inserted into place.

After vacuumization, the low power, visible light illuminates the target of interest and alignment is accomplished as follows:

(a) Optimizing signal-to-noise at the detector or (b) using eyepiece 90 to optimize visually.

Figure 4:
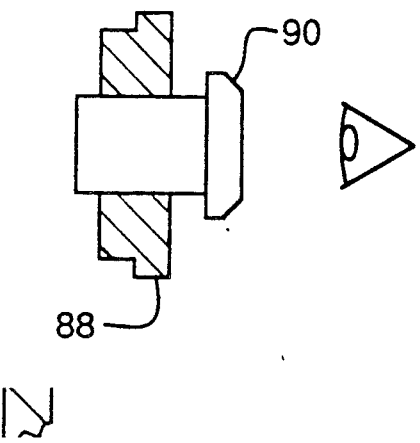
FIG. 4 illustrates by partial cross section a viewing insert.

FIG. 4 illustrates an eyepiece mount 88 and an eyepiece 90 which can be inserted into the second end 84 in place of the fiber optic mount 78 for the sole purpose of observing an area of interest after which the fiber optic mount 78 with the fiber optic cable 80 attached therein is put in place thereof. The first end 92 of the tube body 82 is machined on the inside to receive the second end 70 of the tube body 60.

In order to translate the tubular sections 12, 14 and 16 relative to one another, a first and a second adjusting means 18 and 20 are employed.

Referring to the first adjusting means 18, the adjusting means 18 includes a micrometer screw 94 being conventional, a push pad 96, a micrometer screw support 98, and a plurality of springs 100 acting to pull the push pad 96 and the support 98 together.

FIG. 2 illustrates both the push pad 96 and the micrometer screw support 98, one being upside down as compared to the other. A central hole 102 through the push pad 96 is such to fit closely about the outside of the tube bodies and is held there by set screws, for example, 104. The micrometer screw 94 is insert into a hole 106 and held therein by set screw 108. The micrometer screw support 98 is secured to the tube body 60. Movement of a screw 110 acting against a push pad area 112 causes the tube bodies 28 and 60 to slide upon each other.

The second adjusting means is similarly constructed and is able to slide the tube bodies 60 and 82 upon each other independent of the first adjusting means 18.

The light focused onto the fiber optic end 76 travels through the fiber optic cable 80 to a detector system 114 that, for example, converts the light into electrical signals which are then analyzed by the analyzer 116.

In order to be able to observe different areas of the vacuum chamber, the apparatus 10 may be mounted on a moveable platform 118 such as shown in FIG. 3.

The moveable platform 118 includes a platform 120 having metal bellows 122 welded to the platform 120 and a flange 124 which is mountable to the vacuum chamber port, not shown. A plurality of adjustable screws 126 with fixed pivoting bases 128 having expanding springs 130 thereabout allow for rotating movement of the apparatus 10.

The apparatus 10 is extremely simple to operate. There are no electrical subsystems and only four moving parts. The first tubular section 12 is attached to the vacuum chamber using standard bolts. The desired collimating lens 52 is then placed in its "pop out" support 54. The entire support 54 and the lens 52 are then pushed down to the first end 48 until it is flush with the collar 40 which supports the fused quartz window 42.

The push pad 96 of the first adjustable means 18 is then set screwed onto the tube body 28. The focusing lens 72 is then placed into its "pop out" support 74 and inserted into the second tubular section 14. The second tubular section 14 is then inserted into the first tubular section 12 and the micrometer screw support 98 is set screwed in. The second micrometer push pad 132 is then set screwed into the second tubular section 14. The third tubular section 16 is then inserted into the second tubular section 14 and the micrometer screw support 134 is set screwed in. Finally, the fiber optic cable 80 is inserted into the mount 78 in the rear portion of the third tubular section 16. The fiber optic may then be routed to the desired analytical equipment. In one experiment, the fiber optic was routed to a spectrograph/detector system, which then sent the signal to an optical multichannel analyzer for data reduction and display.

This apparatus 10 may be scaled down in size and mounted on a miniflange. The size of the apparatus 10 is limited by the focal length of the optics which it uses. If the appropriate lenses are available then the apparatus 10 could easily be scaled down enough to mount multiple devices on a single vacuum chamber portal.

Also detection of other types of EM radiation are possible as long as the necessary optics are obtained. Filters can be placed in the sections to discriminate against specific light wavelengths. The apparatus 10 can also be used anywhere it is necessary to image a faint signal from an in-situ source to analytical equipment.

The primary advantage of the apparatus 10 is its ability to increase the signal-to-noise ratio of an optical signal without the use of electronic devices. The apparatus 10 achieves this by spatially resolving the signal and not allowing scattered background light into the cable 80. The stainless steel tubing and baffles prevent scattered light from entering the system and the optical system ensures the signal is coupled into the fiber optic cable. The use of the fiber optic cable allows the signal to be sent long distances with minimum attenuation and a minimum of alignment considerations. Also, the ability for such an apparatus to work in a vacuum environment of 2 times ten to the minus six is an advantage for in-situ analysis of optical plasma during a film deposition. Another feature to the apparatus 10 is its versatility. The F number of the system can be varied with the turn of a micrometer screw. Also, the optics of the system can easily be replaced to meet specific requirements.

Clearly many modifications and variations of the present invention are possible in light of the above teachings and it is, therefore, understood that within the inventive scope of the inventive concept, the invention may be practiced otherwise than specifically claimed.

What is claimed is:

1. A telescoping fiber optic feedthrough apparatus, said apparatus comprising:
   a first tubular section, said first tubular section including:
   a tube body, said tube body having a first and a second end, said second end having a circumferential channel therein;
   a flange, said flange fixedly attached to said tube body, said flange being sealably attachable to a wall having a port therein for said first tubular body;
   a collimating means, said collimating means being placed in said first end of said tube body; and
   an aperture means including an aperture, said aperture means being attached to said first end of said tube body, said aperture means sealing said tube body to prevent the movement of fluid thereto;

a second tubular section, said second tubular section including:

a tube body, said tube body of said second tubular section having a first end and a second end, said first and said second end having a circumferential channel therein, said first end of said tube body of said second tubular section being in sliding contact with said second end of said tube body of said first tubular section in the areas of said channels; and a focusing means, said focusing means being placed in said first end of said tube body of said second tubular section;

a third tubular section, said third tubular section including:

a tube body, said tube body of said third tubular section having a first and a second end, said first end having a circumferential channel therein, said first end of said tube body of said third tubular section being in sliding contact with said second end of said tube body of said second tubular section in the areas of said channels; and a fiber optic mount, said fiber optic mount being mountable in said second end of said tube body of said third tubular section, said fiber optic mount having a hole therethrough for receiving a fiber optic cable;

a first adjustable means, said first adjustable means attached to said first tubular section and said second tubular section whereby adjustment of such causes a relative translation of said sections; and a second adjustable means, said second adjustable means attached to said second tubular section and said third tubular section whereby adjustment of such causes a relative translation of said second and said third tubular sections.

2. An apparatus as defined in claim 1 wherein said aperture includes a first collar, a second collar, two o-rings, and a window, said o-rings being on opposite sides of said window, said collars being on opposite sides of said window in contact with said o-rings, said collars being attachably connected together, said second collar being fixedly attached to said first end of said tube body of said first tubular section.

3. An apparatus as defined in claim 1 wherein said adjustable means includes:

a push pad, said push pad having a central hole therethrough for closely sliding over said tube body, said push pad having a hole therethrough for holding a micrometer screw, said push pad having an area thereon which said micrometer screw can contact, said push pad having set screws thereon for contact with said tube body and said micrometer screw;

a micrometer screw support, said micrometer screw support being the same as said push pad except a micrometer screw is attached in said hole for such; said micrometer screw support being attached to a tube body other than said push pad;

a micrometer screw, said micrometer screw attached in said hole of said support; and a plurality of shrinking springs, said springs being attached between said push pad and said micrometer support and biasing such together except for a screw of said micrometer screw stopping such translation therebetween.

4. An apparatus as defined in claim 1 further including an optical filter means.

5. An apparatus as defined in claim 1 wherein said apparatus is mounted on a moveable platform attached to a port.

* * * * *